(12) United States Patent
Oya

(10) Patent No.: US 9,987,931 B2
(45) Date of Patent: Jun. 5, 2018

(54) METHOD OF DISCONNECTING SECONDARY BATTERY AND ELECTRIC POWER SUPPLY SYSTEM

(71) Applicant: TOYOTA JIDOSHA KABUSHIKI KAISHA, Toyota-shi, Aichi-ken (JP)

(72) Inventor: Ryosuke Oya, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/430,784

(22) Filed: Feb. 13, 2017

(65) Prior Publication Data

US 2017/0232852 A1 Aug. 17, 2017

(30) Foreign Application Priority Data

Feb. 15, 2016 (JP) .................................. 2016-025820

(51) Int. Cl.
| | | |
|---|---|---|
| H01M 8/04 | (2016.01) | |
| B60L 11/18 | (2006.01) | |
| H02J 7/00 | (2006.01) | |
| H02J 7/16 | (2006.01) | |
| H02P 27/06 | (2006.01) | |

(52) U.S. Cl.
CPC ......... B60L 11/1803 (2013.01); H02J 7/0031 (2013.01); H02J 7/0068 (2013.01); H02J 7/166 (2013.01); H02P 27/06 (2013.01)

(58) Field of Classification Search
USPC ............... 318/139, 442, 479, 490, 500, 504
See application file for complete search history.

(56) References Cited

U.S. PATENT DOCUMENTS

| | | | | |
|---|---|---|---|---|
| 8,487,573 | B2* | 7/2013 | Nakamura | F02N 11/087 |
| | | | | 290/38 R |
| 8,519,666 | B2* | 8/2013 | Terao | H02J 7/025 |
| | | | | 320/108 |
| 8,742,718 | B2* | 6/2014 | Sugiyama | B60L 3/003 |
| | | | | 307/10.1 |
| 9,519,027 | B2* | 12/2016 | Kudo | H01M 10/482 |
| 2015/0017485 | A1 | 1/2015 | Manabe et al. | |

FOREIGN PATENT DOCUMENTS

| | | |
|---|---|---|
| JP | 2010-247725 A | 11/2010 |
| WO | WO 2013/099009 A1 | 7/2013 |

\* cited by examiner

*Primary Examiner* — Bentsu Ro
(74) *Attorney, Agent, or Firm* — Finnegan, Henderson, Farabow, Garrett & Dunner, LLP

(57) ABSTRACT

A method of disconnecting a secondary battery which disconnects the secondary battery from an electric power supply path in an electric power supply system performs shutting off a flow of a current to a secondary battery side through a converter after it is detected that there is an abnormality in the secondary battery, and when it is determined that the voltage of the power storage unit is equal to or less than the voltage of the secondary battery by the predetermined value, maintaining a connection of the secondary battery to the electric power supply path and when it is determined that the voltage of the power storage unit is greater than the voltage of the secondary battery by the predetermined value, operating a relay to disconnect the secondary battery from the electric power supply path.

7 Claims, 2 Drawing Sheets

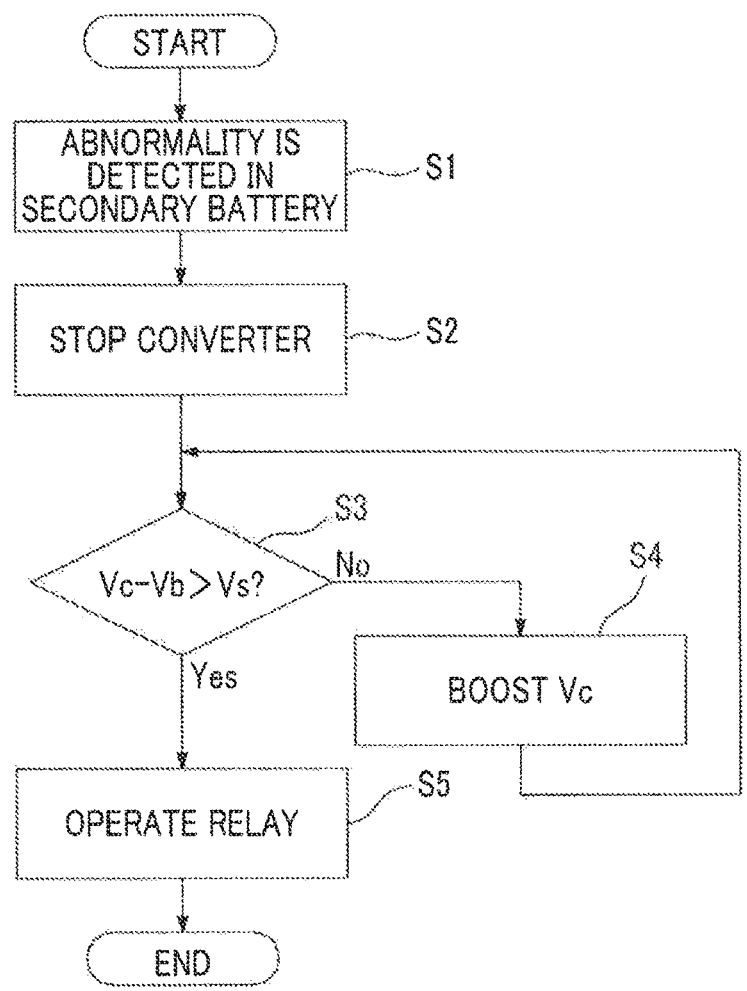

METHOD OF DISCONNECTING SECONDARY BATTERY AND ELECTRIC POWER SUPPLY SYSTEM

INCORPORATION BY REFERENCE

The disclosure of Japanese Patent Application No. 2016-025820 filed on Feb. 15, 2016 including the specification, drawings and abstract is incorporated herein by reference in its entirety.

BACKGROUND

1. Technical Field

The present disclosure relates to a method of disconnecting a secondary battery and an electric power supply system.

2. Description of Related Art

In a fuel battery system including a fuel battery and a secondary battery as an electric power supply source to a load, when an abnormality occurs in the secondary battery, a relay is operated to shut off a circuit between the secondary battery and the load, thereby disconnecting the secondary battery and accessories or a motor for traveling (for example, see WO 2013/099009 A).

SUMMARY

In a case of operating the relay to shut off the circuit, even if a torque command is zero with respect to the motor for traveling, if a current is flowing from the secondary battery to the motor for traveling, the relay may be damaged.

The disclosure provides a method of disconnecting a secondary battery and an electric power supply system capable of smoothly disconnecting the secondary battery from the system while suppressing damage to a relay.

A method of disconnecting a secondary battery according to a first aspect of the disclosure is a method which disconnects the secondary battery from an electric power supply path in an electric power supply system. The electric power supply system is able to supply electric power from the secondary battery to a motor for traveling through the electric power supply path. The electric power supply system includes a converter provided in the electric power supply path between the secondary battery and the motor for traveling, a power storage unit provided at a location closer to the motor for traveling than the converter in the electric power supply path, a relay provided at a location closer to the secondary battery than the converter in the electric power supply path, and a control unit configured to control the motor for traveling, the converter, and the relay. The method of disconnecting a secondary battery includes detecting a presence or absence of an abnormality in the secondary battery, shutting off a flow of a current to a secondary battery side through the converter after it is determined that there is an abnormality in the secondary battery, determining whether or not a voltage of the power storage unit is greater than a voltage of the secondary battery by a predetermined value, and when it is determined that the voltage of the power storage unit is equal to or less than the voltage of the secondary battery by the predetermined value, maintaining a connection of the secondary battery to the electric power supply path and when it is determined that the voltage of the power storage unit is greater than the voltage of the secondary battery by the predetermined value, operating the relay to disconnect the secondary battery from the electric power supply path.

According to the first aspect, if the voltage of the power storage unit is greater than the voltage of the secondary battery by the predetermined value, a current does not flow from the secondary battery toward the motor for traveling. Accordingly, the relay is operated to disconnect the secondary battery from the electric power supply path in this state, whereby circuit shut-off by the relay is supposed to be arc-less release. With this, it is possible to suppress defects, such as damage by fusion of the relay due to arc occurring at the time of the circuit shut-off.

In the first aspect described above, the method may further include, in a case where it is determined that the voltage of the power storage unit is equal to or less than the secondary battery by the predetermined value, charging the power storage unit by regeneration of the motor for traveling until the voltage of the power storage unit becomes greater than the voltage of the secondary battery by the predetermined value.

According to the above-described aspect, the voltage of the power storage unit is increased by regeneration of the motor for traveling, the voltage of the power storage unit is made greater than the voltage of the secondary battery by the predetermined value, whereby it is possible to prevent the current from flowing from the secondary battery to the motor for traveling.

An electric power supply system according to a second aspect of the disclosure is an electric power supply system which is able to supply electric power from a secondary battery to a motor for traveling through an electric power supply path. The electric power supply system includes a converter provided in the electric power supply path between the secondary battery and the motor for traveling, a power storage unit provided at a location closer to the motor for traveling than the converter in the electric power supply path, a relay provided at a location closer to the secondary battery than the converter in the electric power supply path, and a control unit configured to control the motor for traveling, the converter, and the relay. The control unit is configured to i) detect an abnormality in the secondary battery, ii) shut off a flow of a current to a secondary battery side through the converter after an abnormality in the secondary battery is detected, iii) determine whether or not a voltage of the power storage unit is greater than a voltage of the secondary battery by a predetermined value, and iv) when it is determined that the voltage of the power storage unit is equal to or less than the voltage of the secondary battery by the predetermined value, maintain a connection of the secondary battery to the electric power supply path and when it is determined that the voltage of the power storage unit is greater than the voltage of the secondary battery by the predetermined value, operate the relay to disconnect the secondary battery from the electric power supply path.

According to the method of disconnecting a secondary battery and the electric power supply system of the disclosure, it is possible to smoothly the secondary battery from the system while suppressing damage to the relay.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is a flowchart showing arc-less release control in the method of disconnecting a secondary battery according to the embodiment of the disclosure.

DETAILED DESCRIPTION OF EMBODIMENTS

Figure 1:
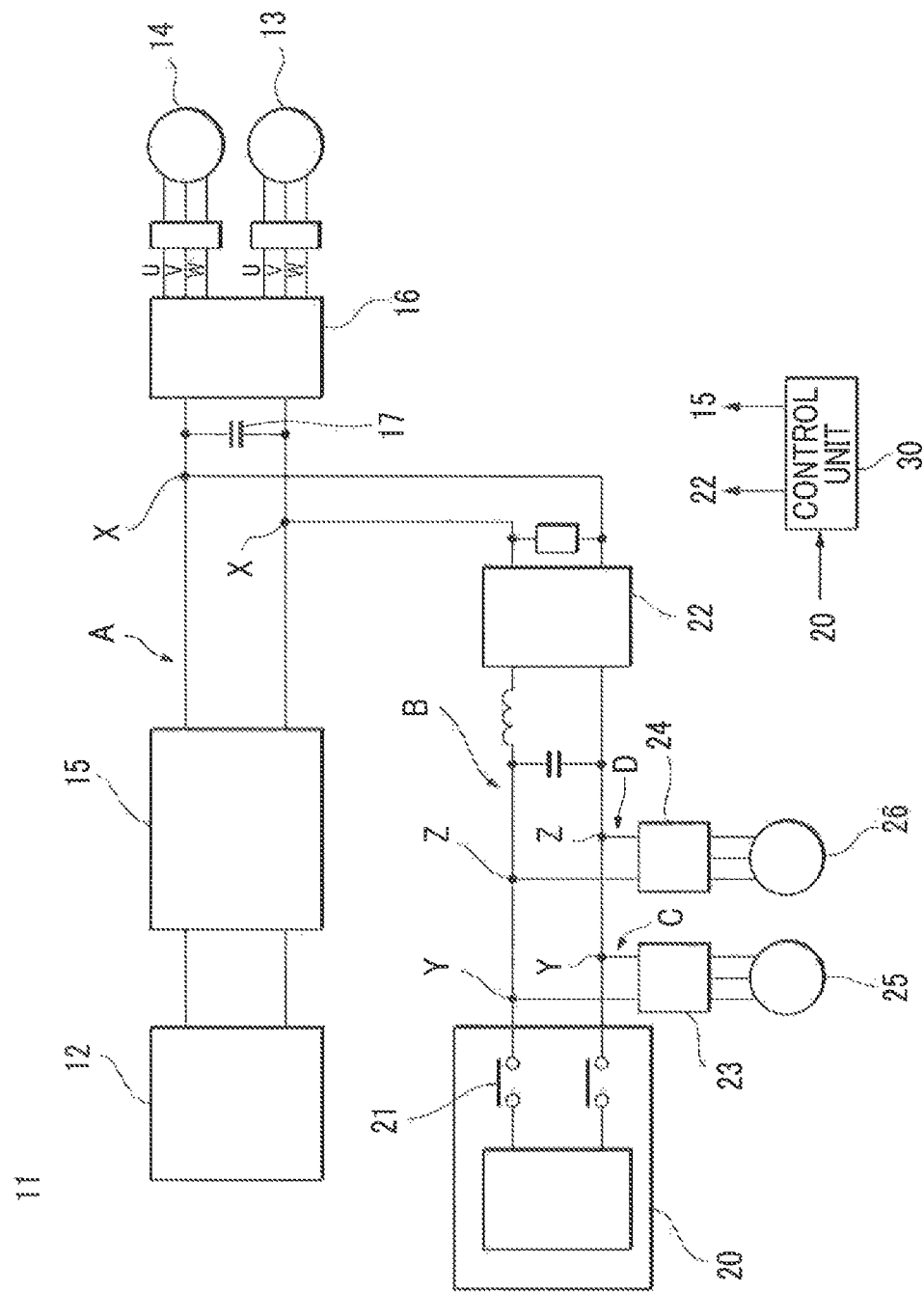
FIG. 1 is a schematic configuration diagram of a fuel battery system to which a method of disconnecting a secondary battery according to an embodiment of the disclosure is applied.

Next, an embodiment of a method of disconnecting a secondary battery according to the disclosure will be described. In this embodiment, a fuel battery system including a fuel battery will be described as an example.

FIG. 1 is a schematic configuration diagram of a fuel battery system to which the method of disconnecting a secondary battery according to the embodiment of the disclosure is applied. As shown in FIG. 1, a fuel battery system (electric power supply system) 11 of this embodiment includes a fuel battery 12 and a secondary battery 20 as an electric power supply source to a load.

The fuel battery 12 is, for example, a polymer electrolyte fuel battery, and has a stack structure in which a plurality of unit cells are laminated. Each of the unit cells has a structure in which an air electrode is provided on one surface of an electrolyte made of an ion exchange membrane, a fuel electrode is provided on the other surface of the electrolyte, and a pair of separators are provided so as to sandwich the air electrode and the fuel electrode from both sides thereof. Then, a hydrogen gas as a fuel gas is supplied to a hydrogen gas flow passage of one separator, air as an oxidant gas is supplied to an oxidant gas flow passage of the other separator, and electric power is generated by electrochemical reaction of these gases.

The fuel battery 12, a traction motor 13, and a drive motor 14 are connected through an electric power supply path A. The traction motor 13 is a motor which makes a vehicle travel, and the drive motor 14 is a motor for a compressor which pumps air (oxidant gas) to the fuel battery 12. In the electric power supply path A, a FC boost converter 15, a capacitor 17, and an intelligent power module (IPM) 16 are provided in this order from the fuel battery 12 side.

The FC boost converter 15 is a DC voltage converter, and is configured to adjust a DC voltage input from the fuel battery 12 and output the voltage to the IPM 16. The traction motor 13 and the drive motor 14 are, for example, three-phase AC motors, and the IPM 16 converts a DC current to a three-phase current and supplies the three-phase current to the traction motor 13 and the drive motor 14.

An electric power supply path B is connected to the electric power supply path A. A connection point X of the electric power supply path A and the electric power supply path B is positioned between the FC boost converter 15 and the IPM 16. The secondary battery 20 is connected to one end of the electric power supply path B, and a battery boost converter 22 is provided between the secondary battery 20 and the connection point X.

The secondary battery 20 can charge a surplus of output electric power of the fuel battery 12 or regenerative electric power of the traction motor 13, traction motor 13, supply a shortage of electric power in a case where output electric power of the fuel battery 12 runs short for electric power necessary for driving the drive motor 14, or supply electric power to accessory motors 25, 26 described below based on a control signal from a control unit 30. In the secondary battery 20, a relay 21 which opens or closes a circuit with the electric power supply path B is provided.

The battery boost converter 22 is a DC voltage converter, and has a function of adjusting a DC voltage input from the secondary battery 20 and outputting the voltage to the traction motor 13 and the drive motor 14 and a function of adjusting a DC voltage input from the fuel battery 12 or the traction motor 13 and outputting the voltage to the secondary battery 20 and/or the accessory motors 25, 26. With such functions of the battery boost converter 22, charging/discharging of the secondary battery 20 is realized.

With such functions of the battery boost converter 22, at the time of normal operation of the fuel battery system 11, an input voltage to the IPM 16 is controlled, and in a case where the secondary battery 20 is brought in a state of being disconnected from the fuel battery system 11 (at the time of the occurrence of an abnormality in the secondary battery 20), electric power can be supplied from the fuel battery 12 to the accessory motors 25, 26.

Electric power supply paths C, D are connected to a low voltage side of the electric power supply path B (the secondary battery 20 side). Connection points Y, Z of the electric power supply path B and the electric power supply paths C, D are positioned between the battery boost converter 22 and the secondary battery 20. In the electric power supply paths C, D, accessory inverters 23, 24 and the accessory motors 25, 26 are provided.

The accessory motor 25 is a motor which drives a hydrogen pump for flowing back a hydrogen-off gas discharged from the hydrogen gas flow passage of the fuel battery 12 to the fuel battery 12. The accessory motor 26 is a motor which drives a cooling water pump for circulating cooling water used for temperature control of the fuel battery 12. The accessory inverters 23, 24 respectively convert a DC current to a three-phase current and supply the three-phase current to the accessory motors 25, 26.

The control unit 30 is a computer system which performs integrated control of the fuel battery system 11, and has, for example, a central processor unit (CPU), a random access memory (RAM), a read only memory (ROM), and the like. The control unit 30 receives an input of signals (for example, a signal representing an accelerator pedal angle, a signal representing a vehicle speed, a signal representing an output current or an output voltage of the fuel battery 12, and the like) supplied from various sensors and calculates required electric power of all loads including the traction motor 13, the drive motor 14, and the accessory motors 25, 26.

The control unit 30 of this embodiment can also detect the occurrence of an abnormality, such as a fault of the secondary battery 20, based on signals supplied from secondary battery 20 and sensors provided in the vicinity thereof. That is, the control unit 30 also includes a function as an abnormality detection unit.

In a case where the occurrence of an abnormality in the secondary battery 20 is detected, the control unit 30 operates the relay 21 to disconnect the secondary battery 20 and shuts off the supply of electric power from the secondary battery 20 to the traction motor 13, the drive motor 14, and the accessory motors 25, 26.

As loads other than the traction motor 13, the drive motor 14, and the accessory motors 25, 26, electric power consumed in devices (transmission, wheel control device, steering device, suspension device, and the like) necessary for vehicle traveling, electric power consumed in devices (air conditioner, illumination, lighting device, and the like) provided in an occupant space, or the like is exemplified.

The control unit 30 determines distribution of respective output electric power of the fuel battery 12 and the secondary battery 20 and calculates a power generation command value. Specifically, if required electric power for the fuel battery 12 and the secondary battery 20 is calculated, the control unit 30 controls the operations of the FC boost converter 15 and the battery boost converter 22 such that the required electric power is obtained.

During normal operation including when no abnormality occurs in the secondary battery 20, the control unit 30 makes the FC boost converter 15 control the output voltage of the fuel battery 12 and makes the battery boost converter 22 control the output voltage to the traction motor 13 and the drive motor 14, in other words, the input voltage to the IPM 16. Meanwhile, at the time of the occurrence of an abnormality in the secondary battery 20, the control unit 30 makes the battery boost converter 22 control the output voltage to the accessory motors 25, 26 and makes the FC boost converter 15 control the output voltage thereof, in other words, the input voltage to the IPM 16 so as to match a required output of the entire fuel battery system 11 including a drive output of the traction motor 13, the drive motor 14, and the accessory motors 25, 26.

In the fuel battery system 11 of this embodiment, when a fault (abnormality) of the secondary battery 20 is detected, the control unit 30 operates the relay 21 to disconnect the secondary battery 20, thereby switching system control to a battery-less retreat traveling mode and continuing vehicle operation.

On the other hand, when operating the relay 21 to disconnect the secondary battery 20 from the fuel battery system 11, even if a torque command is zero with respect to the traction motor 13, if a current is flowing from the secondary battery 20 to the traction motor 13, the relay 21 may be fused and damaged.

For this reason, in the fuel battery system 11 according to this embodiment, the control unit 30 performs the following arc-less release control.

FIG. 2 is a flowchart showing arc-less release control in the method of disconnecting a secondary battery according to the embodiment of the disclosure.

(Abnormality Detection Step, Current Shut-off Step) If an abnormality, such as a fault of the secondary battery 20, is detected (Step S1), the control unit 30 minimizes power consumption such that all accessories (the traction motor 13, the drive motor 14, the accessory motors 25, 26, and the like) of the fuel battery system 11 are driven at a minimum level set in advance. With this, the fuel battery 12 is brought into nearly a power generation stop state, and the FC boost converter 15 and the battery boost converter 22 are stopped. When this happens, the flow of a current to the secondary battery 20 side is shut off by the stopped battery boost converter 22 (Step S2).

(Voltage Determination Step) In this state, the control unit 30 compares a capacitor voltage Vc as the voltage of the capacitor 17 with a battery voltage Vb as the voltage of the secondary battery 20. Then, as shown in Expression (1) described below, it is determined whether or not the capacitor voltage Vc is greater than a voltage value obtained by adding a predetermined value Vs to the battery voltage Vb, that is, whether or not the capacitor voltage Vc is greater than the battery voltage Vb by the predetermined value Vs (Step S3).

$$Vc-Vb>Vs \quad (1)$$

The predetermined value Vs is a voltage value which is determined from an precision of a sensor, such as a voltage sensor, the capacity of the capacitor 17, or the like.

(Charging Step) In a case where the capacitor voltage Vc is equal to or less than the voltage value obtained by adding the predetermined value Vs to the battery voltage Vb, that is, in a case where the capacitor voltage Vc is equal to or less than the battery voltage Vb by the predetermined value Vs (Step S3: No), the control unit 30 does not operated the relay 21, in other words, does not disconnect the secondary battery 20 from the electric power supply path B, charges the capacitor 17 by regeneration of the traction motor 13, and boosts the capacitor voltage Vc (Step S4). Charging of the capacitor 17 by regeneration of the traction motor 13 is continued until the capacitor voltage Vc becomes greater than the battery voltage Vb by the predetermined value Vs, without depending on a user's request or the like.

On the other hand, in a high vehicle speed state in which the vehicle is traveling at high speed, since the rotation speed of the traction motor 13 is high, when boosting the capacitor voltage Vc, the capacitor 17 may be brought into an over-voltage state. In this case, the control unit 30 drives the drive motor 14 of the air compressor. Then, the capacitor voltage Vc is deboosted by the driving of the drive motor 14, and an over-voltage of the capacitor 17 is suppressed.

(Disconnection Step) In a case where the capacitor voltage Vc is greater than the voltage value obtained by adding the predetermined value Vs to the battery voltage Vb, that is, in a case where the capacitor voltage Vc is greater than the battery voltage Vb by the predetermined value Vs (Step S3: Yes), the control unit 30 stops all accessories (the traction motor 13, the drive motor 14, the accessory motors 25, 26, and the like) of the fuel battery system 11, and then, operates the relay 21 to disconnect the secondary battery 20 from the electric power supply path B (Step S5).

At this time, since the capacitor voltage Vc is greater than the battery voltage Vb by the predetermined value Vs, a current does not flow from the electric power supply path B, to which the secondary battery 20 is connected, to the electric power supply path A, to which the traction motor 13 and the drive motor 14 are connected. Accordingly, circuit shut-off by the relay 21 is supposed to arc-less release, and defects, such as fusion due to the occurrence of arc at the time of shut-off, are suppressed.

If the capacitor voltage Vc and the battery voltage Vb are equal, a current does not flow from the electric power supply path B, to which the secondary battery 20 is connected, to the electric power supply path A, to which the traction motor 13 and the drive motor 14 are connected. However, in this case, if the capacitor 17 is discharged, the capacitor voltage Vc becomes smaller than the battery voltage Vb, a current flows from the secondary battery 20, and in this state, the relay 21 may be operated. For this reason, in the comparison of the capacitor voltage Vc and the battery voltage Vb, a margin is given to the voltage value, which is determined from a precision of a sensor, such as a voltage sensor, the capacity of the capacitor 17, or the like, as the predetermined value Vs.

As described above, according to the method of disconnecting a secondary battery according to this embodiment, if the capacitor voltage Vc is greater than the battery voltage Vb by the predetermined value Vs, a current does not flow from the secondary battery 20 toward the traction motor 13. Accordingly, in this state, the relay 21 is operated to disconnect the secondary battery 20 from the electric power supply path B, whereby circuit shut-off by the relay 21 is supposed to be arc-less release. With this, it is possible to suppress defects, such as damage by fusion of the relay 21 due to the occurrence of arc at the time of the circuit shut-off.

In a case where the capacitor voltage Vc is equal to or less than the battery voltage Vb by the predetermined value, the capacitor 17 is charged by regeneration of the traction motor 13 to increase the capacitor voltage Vc, and the capacitor voltage Vc is made greater than the battery voltage Vb by the predetermined value. With this, it is possible to prevent a current from flowing from the secondary battery 20 toward the traction motor 13.

In the foregoing embodiment, although the capacitor 17 is provided in the electric power supply path A, the disclosure is not limited to the capacitor 17 as long as a device stores electric power, and for example, a secondary battery or the like may be provided.

In the foregoing embodiment, as an electric power supply system including the secondary battery 20, although the fuel battery system 11 including the fuel battery 12 has been described as an example, an electric power supply system may be, for example, a system not including the fuel battery 12, such as an electric vehicle.

What is claimed is:

1. A method of disconnecting a secondary battery which disconnects the secondary battery from an electric power supply path in an electric power supply system, the electric power supply system being able to supply electric power from the secondary battery to a motor for traveling through the electric power supply path, and the electric power supply system including a converter provided in the electric power supply path between the secondary battery and the motor for traveling, a power storage unit provided at a location closer to the motor for traveling than the converter in the electric power supply path, a relay provided at a location closer to the secondary battery than the converter in the electric power supply path, and a control unit configured to control the motor for traveling, the converter, and the relay, the method comprising:
   detecting a presence or absence of an abnormality in the secondary battery;
   shutting off a flow of a current to a secondary battery side through the converter after it is detected that there is an abnormality in the secondary battery;
   determining whether or not a voltage of the power storage unit is greater than a voltage of the secondary battery by a predetermined value; and
   when it is determined that the voltage of the power storage unit is equal to or less than the voltage of the secondary battery by the predetermined value, maintaining a connection of the secondary battery to the electric power supply path and when it is determined that the voltage of the power storage unit is greater than the voltage of the secondary battery by the predetermined value, operating the relay to disconnect the secondary battery from the electric power supply path.

2. The method according to claim 1, further comprising:
   in a case where it is determined that the voltage of the power storage unit is equal to or less than the voltage of the secondary battery by the predetermined value, charging the power storage unit with regeneration of the motor for traveling until the voltage of the power storage unit becomes greater than the voltage of the secondary battery by the predetermined value.

3. The method according to claim 1, wherein
   in a case where it is determined that the voltage of the power storage unit is greater than the voltage of the secondary battery by the predetermined value, all accessories of the electric power supply system are stopped, and then, the relay is operated to disconnect the secondary battery from the electric power supply path.

4. The method according to claim 1, wherein
   all accessories of the electric power supply system are driven at a minimum level set in advance and power consumption is minimized to shut off the flow of the current to the secondary battery side through the converter.

5. The method according to claim 1, wherein
   the predetermined value is a voltage value which is determined from a precision in a sensor configured to measure the voltage or a capacity of the power storage unit.

6. An electric power supply system which is able to supply electric power from a secondary battery to a motor for traveling through an electric power supply path, the electric power supply system comprising:
   a converter provided in the electric power supply path between the secondary battery and the motor for traveling;
   a power storage unit provided at a location closer to the motor for traveling than the converter in the electric power supply path;
   a relay provided at a location closer to the secondary battery than the converter in the electric power supply path; and
   a control unit configured to control the motor for traveling, the converter, and the relay,
   wherein the control unit is configured to
   i) detect an abnormality in the secondary battery,
   ii) shut off a flow of a current to a secondary battery side through the converter after an abnormality in the secondary battery is detected,
   iii) determine whether or not a voltage of the power storage unit is greater than a voltage of the secondary battery by a predetermined value, and
   iv) when it is determined that the voltage of the power storage unit is equal to or less than the voltage of the secondary battery by the predetermined value, maintain a connection of the secondary battery to the electric power supply path and when it is determined that the voltage of the power storage unit is greater than the voltage of the secondary battery by the predetermined value, operate the relay to disconnect the secondary battery from the electric power supply path.

7. The electric power supply system according to claim 6, wherein
   the control unit is configured to, in a case where it is determined that the voltage of the power storage unit is equal to or less than the voltage of the secondary battery by the predetermined value, charge the power storage unit by regeneration of the motor for traveling until the voltage of the power storage unit becomes greater than the voltage of the secondary battery by the predetermined value.

* * * * *